April 5, 1927. 1,623,501
B. C. SMITH
INTERNAL COMBUSTION ENGINE
Filed May 5, 1923 2 Sheets-Sheet 1

INVENTOR
B. C. Smith
BY
Mitchell Brothers,
ATTORNEYS.

April 5, 1927.  1,623,501
B. C. SMITH
INTERNAL COMBUSTION ENGINE
Filed May 5, 1923  2 Sheets-Sheet 2
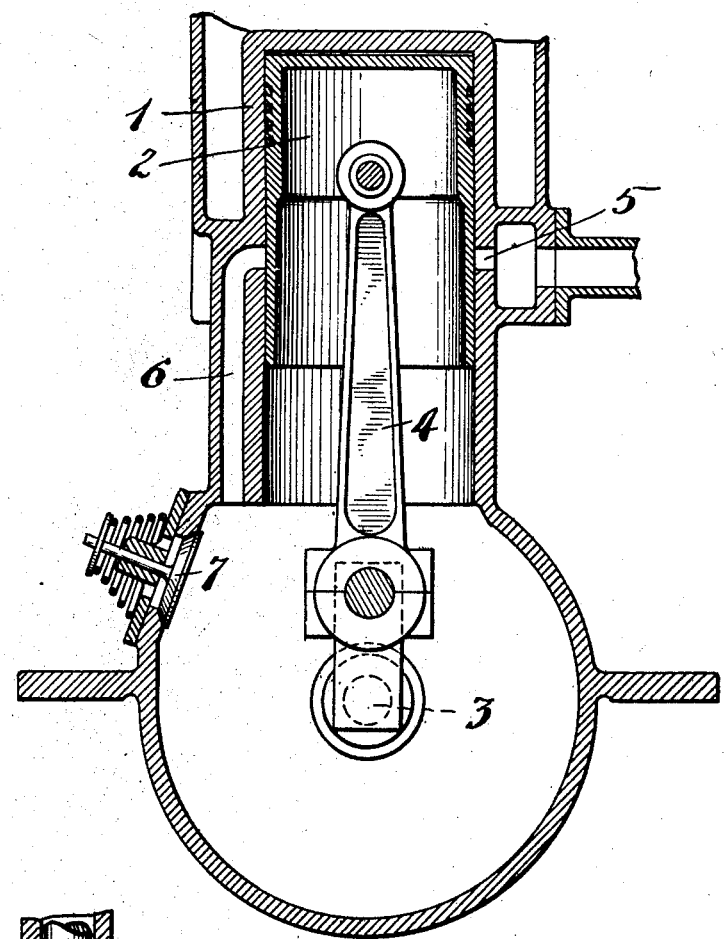
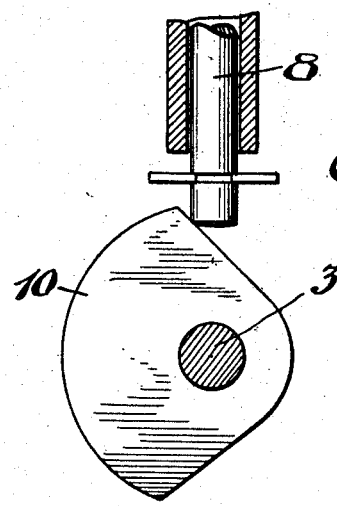
INVENTOR
B. C. Smith
BY
ATTORNEYS.

Patented Apr. 5, 1927.

1,623,501

UNITED STATES PATENT OFFICE.

BENJAMIN C. SMITH, OF WESTFIELD, NEW JERSEY, ASSIGNOR TO STANDARD MOTOR CONSTRUCTION COMPANY, OF JERSEY CITY, NEW JERSEY, A CORPORATION OF NEW JERSEY.

INTERNAL-COMBUSTION ENGINE.

Application filed May 5, 1923. Serial No. 636,994.

My invention relates to improvements in fuel burning engines of the internal combustion type. I shall show and describe my invention as applied to an engine in which compression alone is relied upon to effect the ignition of the fuel, as this type of engine has many advantages, in that it may successfully utilize low-grade hydro-carbon fuel, such as heavy oil. My invention is particularly useful in connection with engines employing cylinders of relatively small bore. In such engines the actual volume per charge of fuel in a liquid state is so very small that it cannot be accurately controlled or measured for subsequent mixture with air so that the best conditions will obtain under varying speed and load. To that end, I have conceived the idea of preparing the liquid fuel in advance of its introduction into the combustion chamber in such a manner that it can be, in its prepared states, easily and accurately measured so as to be thereafter mixed with a volume of air in the proper proportions to form the desired ignitible mixture, whereby I attain a higher degree of efficiency than would otherwise be possible. In preparing the liquid fuel in advance of its introduction into the combustion chamber, I provide means to break up the liquid into fine particles, which are held in suspension in a special chamber until required in the combustion chamber. At the proper time I cause a portion of the contents of said chamber to be measured off and transferred into the combustion chamber, wherein it is mixed with atmospheric air in the proper proportion to produce an effective ignitible charge. Since the volume of this prepared fuel charge is relatively very much greater than it would be were said fuel in a liquid state, I am able to more accurately measure the quantity of fuel that is transferred to form a single ignitible charge than would otherwise be possible. Heretofore, in engines of the smaller sizes, effective control in this respect has been practically impossible of attainment, because, where liquid fuel is fed to the combustion chamber, an exceedingly small passage is required and a very delicate valve must be used. Because of the smallness of the passage and the delicacy of the valve, it has been found practically impossible to variably control the volume per charge of fuel in a liquid state in such a manner as to secure that degree of efficiency now demanded in such engines. By my present improvement the passage through which the fuel is fed is relatively very large and cannot become clogged. The metering valve is also of the simplest possible type, and is easy to maintain and operate. There is, therefore, no danger of stoppage in the fuel feed passage, and there is no delicate or difficult duty imposed upon the control valve itself.

In the accompanying drawings—

Figure 2 is a similar view, taken on a plane at right angles to that of Fig. 1, the upper part of the engine being broken away.

Figure 3 is a detail view.

Figure 1:
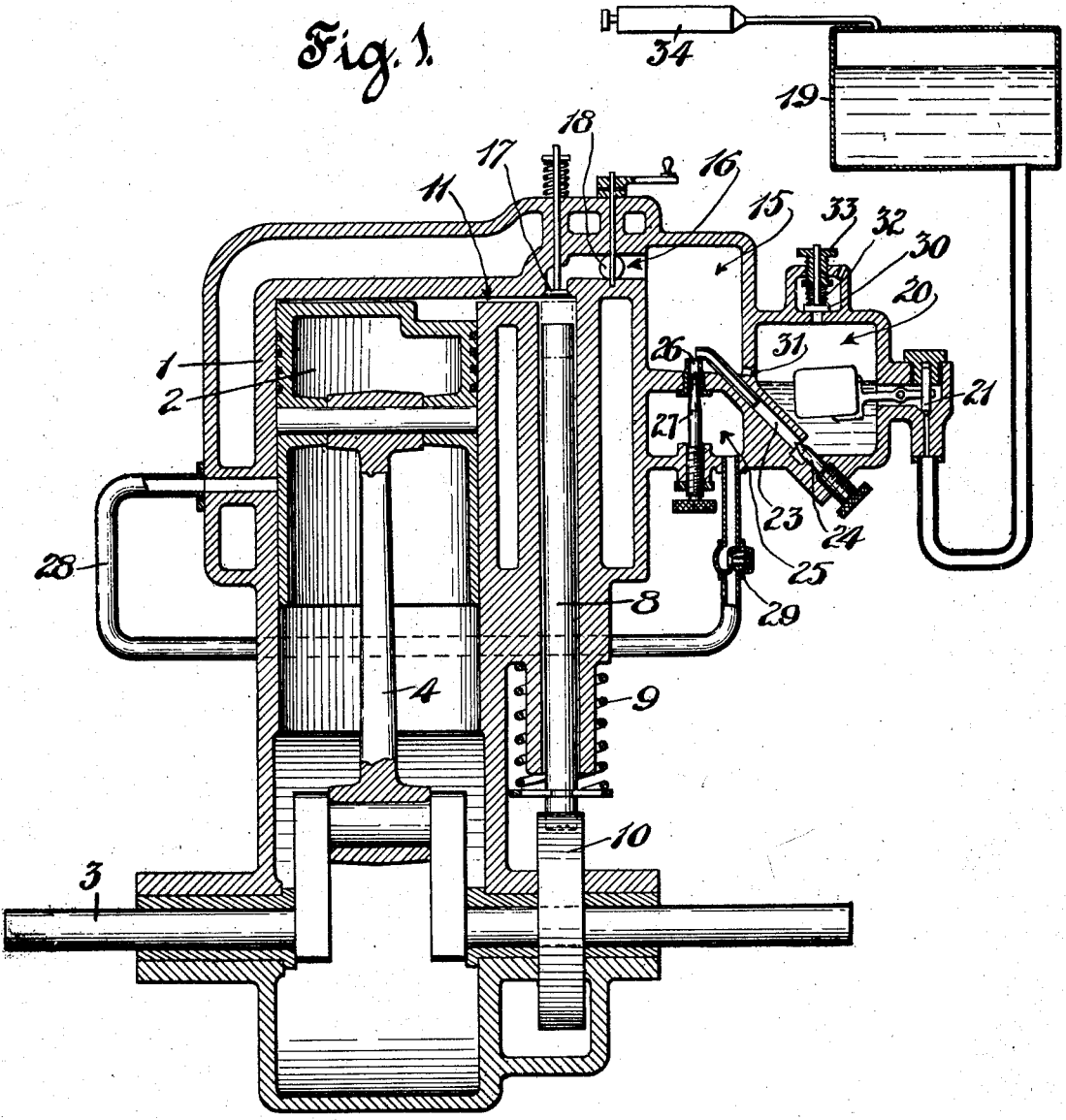
Figure 1 is a vertical sectional view of an internal combustion engine constructed to embody my invention, said engine being of the two-cycle type, the section being taken in the plane of the crank shaft.

In the drawings, 1 represents the wall of the working cylinder. 2 represents the usual working piston. 3 represents the usual crank shaft. 4 represents the usual connecting rod. 5 represents the usual exhaust port or outlet common in engines of the two-cycle variety, said outlet being uncovered by the piston 2 adjacent the end of its power stroke. 6 represents an air port connecting the crank chamber with the interior of the working cylinder, said port being open when the piston is in its lower position whereby air compressed in the crank chamber by the descending piston may be transferred therefrom into the working chamber of the cylinder. The inrush of this air into the working cylinder assists in expelling the burnt gases therefrom in the usual manner. 7 represents a valve, which admits air into the crank chamber on the up-stroke of the piston.

8 represents a plunger mounted in a bore alongside the working cylinder, said plunger being moved downwardly by a spring 9 and upwardly by a cam 10 mounted on the engine shaft 3. 11 is a small passage connecting the space above the plunger 8 with the combustion chamber in the head of the working cylinder. 15 represents a chamber preferably located close to the side of the working cylinder, so that the walls thereof will preferably be heated to some degree. 16 is a passage leading from the chamber 15 into the space above the plunger 8. 17 is a check valve in said passage. 18 is a manually controllable metering valve or throttle, which, as shown, is a simple butterfly valve, so called. 19 is a reservoir which may contain a suitable supply of fuel in a liquid state. 20 is a fuel chamber on the side of the engine in which a suitable quantity of fuel in a liquid state is maintained at a constant level by the use of a float-controlled valve 21, which valve in turn controls the fuel supply passage 22 leading from the main reservoir 19 to the float-controlled chamber 20. The chamber 15 is located on a higher plane than the fixed level of liquid fuel in the chamber 20. 23 is a passage leading from the lower part of the chamber 20 into the chamber 15. 24 is a regulating valve for controlling the size of the passage 23. 25 is a chamber in which pressure of gas or air is maintained. 26 is a passage leading from the chamber 25 into the chamber 15. 27 is a valve for controlling passage 26. The passage 26 is so located with respect to the end of the passage 23 that gas or air rushing through said passage 26 will draw liquid fuel up through said passage and atomize it within the chamber 15, so as to maintain therein a supply of a mixture much too heavy or rich to form alone the proper charge and in which the fine particles of fuel are in suspension in the gas or air. Pressure within the chamber 25 may be secured by any suitable means. In the form shown I have provided a pipe 28 leading from the working chamber of the working cylinder to the interior of the chamber 25, so that when the piston descends on its power stroke the pressure generated by the burning and expanding gases will cause a portion of the burnt, or partially burnt, gases to flow through the pipe 28 into the chamber 25 sufficiently to build up an adequate pressure therein, to produce the atomizing effect aforesaid.

29 represents a check valve in the conduit 28. The check valve permits gas to flow through the conduit 28 and into the chamber 25, but prevents its back flow. 30 is an escape valve in the upper part of the float chamber 20 to relieve excess pressure. 31 is a passage leading from the bottom of the chamber 15 back into the chamber 20. This passage 31 performs a dual function. It not only permits such fuel as may be condensed and collected in the bottom of chamber 15 to flow back into the float chamber 20, but it also equalizes the pressure in the two chambers 15 and 20, for otherwise, if the pressure in the chamber 15 exceeded that in the chamber 20 it would drive back the fuel in the passage 23 and the atomizing action would cease.

The valve 30 is held closed by a spring 32, which may have a screw adjustment 33 so that the same may be regulated to open only at the desired pressure.

Any suitable means may be provided for maintaining pressure on the fuel supply in the tank 19, as is common practice. In this connection I have conventionally shown a small hand-operated air pump 34, which may be employed for this purpose.

*Operation.*—Referring to the drawings, it may be assumed that, in Fig. 1, the piston is at the top of its stroke and that a charge has just been ignited. This will operate to force the piston 2 downwardly on its power stroke. The crank chamber is filled with atmospheric air at this time. As the piston descends on its power stroke, atmospheric air in the crank chamber will be put under compression. When the piston uncovers the end of the conduit 28, a small portion of the expanding gas will flow through the same into the chamber 25 to maintain pressure, for the purpose of operating the atomizer. This affords one means for maintaining in the chamber 25 an adequate supply of liquid fuel in a finely divided state but too densely mixed in the gas therein to be of use as an ignitible charge until further adulterated with oxygen. Just before the piston reaches the lower end of its power stroke it will open exhaust port 5 and intake port 6, whereupon the burnt gases pass outwardly through the exhaust 5 and the compression within the cylinder drops, so that fresh air may rush in through the port 6. The cam 10 is so designed as to permit the plunger 8 to move downwardly under the action of the spring 9. On the downward movement of this plunger 8, a portion of the finely divided liquid fuel contained in the chamber 15 flows into the space above said plunger sufficient to supply one ignitible charge, when mixed with the air in the combustion chamber, the actual quantity being variably controlled by means of the throttle 18. The working piston 2 now ascends and compresses the air contained in the working cylinder. At the proper time, when the working piston 2 approaches the top of its compression stroke, the cam 10 operates to quickly force the plunger 9 upwardly, so that it will, in turn, force the fuel charge contained in the space above it into the now highly compressed air in the combustion chamber of the working cylinder 1.

In the preferred construction the compression secured by the combined action of the piston 2 and the plunger 8 is sufficient to cause spontaneous ignition of the now ignitible charge in the combustion chamber. It is manifest that whenever the compression within the working chamber and the space above the plunger 8 is in excess of the pressure within the chamber 15, the check valve 17 will close. If, by chance, the pressure in the chamber 15 should be excessive, the relief valve 31 will open sufficiently to lower the pressure to the desired extent.

It will be seen that by my improvement

I provide means to prepare the fuel in advance of mixing it with sufficient air to form a proper ignitible mixture so that the amount of fuel per charge may be accurately measured which, as I have indicated at the outset, is highly important in engines having cylinders of small bore and which measurement, in such engines, is impossible of accurate attainment when solid fuel in a liquid state is employed.

It will be understood that the term "gas," in referring to the medium which holds the finely divided liquid fuel in suspension preparatory to its delivery to the fuel-feeding means, is used in its broadest sense, to include air or any other gaseous medium that will hold said finely divided fuel in a suspended state.

I have shown and described only one embodiment of my invention, and wish to have it understood that I fully appreciate that many changes may be made in the construction, arrangement, design and proportion of the various parts without departing from the spirit and scope thereof.

I claim:

1. In an internal combustion engine, a working cylinder having an inlet and an exhaust outlet, said engine having a chamber alongside said cylinder for containing a quantity of liquid fuel in a finely divided state, a spraying device, a chamber adjacent thereto containing gas under pressure for operating the sprayer, said chamber being in communication with the interior of the working cylinder to derive pressure therefrom, a check valve for the passage providing said communication, a communicating passage between the first mentioned chamber and the interior of the working cylinder, and measuring and pressure feeding mechanism communicating with said communicating passage and operating to transfer a measured portion of the fuel supply in the first mentioned chamber from the latter into the working cylinder.

2. In an internal combustion engine, a working cylinder having an inlet and an exhaust outlet, said engine having a chamber alongside said cylinder for containing under pressure a quantity of fuel in a finely divided state, a spraying device, a chamber adjacent thereto containing gas under pressure for operating the sprayer, said chamber being in communication with the interior of the working cylinder to derive pressure therefrom, a check valve for the passage providing said communication, a communicating passage having a check valve therein between the first mentioned chamber and the interior of the working cylinder, and measuring and pressure feeding mechanism between said first mentioned chamber and said cylinder and communicating with said communicating passage and operating to transfer a measured portion of the fuel supply in the first mentioned chamber from the latter into the working cylinder.

3. In an internal combustion engine, a working cylinder, a chamber for containing a quantity of gas heavily charged with finely divided hydrocarbon in suspension, means for heavily charging said gas with said fuel in said state, means between said chamber and said cylinder for intermittently measuring off and feeding under pressure a portion of said fuel so prepared into the combustion chamber of said cylinder to form with the air in the latter an ignitible charge, said charging means being constructed to put the heavily charged gas in said chamber under pressure greater than atmosphere, and a valve for relieving excess pressure therein.

4. In an internal combustion engine, a working cylinder, a chamber for containing a quantity of gas heavily charged with finely divided hydrocarbon in suspension, means for heavily charging said gas with said fuel in said state, means between said chamber and said cylinder for intermittently measuring off and feeding under pressure a portion of said fuel so prepared into the combustion chamber of said cylinder to form with the air in the latter an ignitible charge, said charging means being constructed to put the heavily charged gas in said chamber under pressure greater than atmosphere, and a regulatable valve for relieving excess pressure therein.

BENJAMIN C. SMITH.